(12) United States Patent
Newsom, III et al.

(10) Patent No.: US 12,169,833 B2
(45) Date of Patent: Dec. 17, 2024

(54) APPLICATION PROGRAMMING INTERFACE (API)-ENABLED AUTOMATED COMPLIANCE VERIFICATION AND PROCESSING

(71) Applicant: Bank of America Corporation, Charlotte, NC (US)

(72) Inventors: Jesse S. Newsom, III, Charlotte, NC (US); Kevin A. Delson, Woodland Hills, CA (US); Gilbert M. Gatchalian, Union, NJ (US)

(73) Assignee: Bank of America Corporation, Charlotte, NC (US)

( * ) Notice: Subject to any disclaimer, the term of this patent is extended or adjusted under 35 U.S.C. 154(b) by 428 days.

(21) Appl. No.: 17/369,534

(22) Filed: Jul. 7, 2021

(65) Prior Publication Data

US 2023/0012019 A1 Jan. 12, 2023

(51) Int. Cl.
*G06Q 20/40* (2012.01)
*G06F 9/54* (2006.01)
*G06F 16/23* (2019.01)
*H04L 9/32* (2006.01)

(52) U.S. Cl.
CPC .......... *G06Q 20/401* (2013.01); *G06F 9/541* (2013.01); *G06F 16/2379* (2019.01); *H04L 9/3263* (2013.01); *G06Q 2220/00* (2013.01)

(58) Field of Classification Search
CPC .......... G06Q 20/40; G06F 9/54; G06F 16/23; H04L 9/32
See application file for complete search history.

(56) References Cited

U.S. PATENT DOCUMENTS

| | | | |
|---|---|---|---|
| 7,213,744 B2 | 5/2007 | Michelsen et al. | |
| 8,152,054 B2 | 4/2012 | Bulawa et al. | |
| 10,922,754 B2 | 2/2021 | Song et al. | |
| 2007/0038560 A1 | 2/2007 | Ansley | |
| 2008/0249938 A1* | 10/2008 | Drake-Stoker | H04W 12/106 726/2 |
| 2012/0074216 A1 | 3/2012 | Henry et al. | |
| 2017/0083898 A1* | 3/2017 | Sidhu | G06Q 20/40 |

FOREIGN PATENT DOCUMENTS

WO WO-2016201267 A1 * 12/2016 ............. G06Q 20/00
WO WO-2019145905 A1 * 8/2019 ............. G06Q 20/02

OTHER PUBLICATIONS

Darrel Ince, A Dictionary of the Internet, 2019, Oxford Reference, 4th edition, blacklist and whitelist (Year: 2019).*
What is an anti-money laundering check ?; https://help.crowdcube.com/hc/en-us/articles/206232264-What-is-an-anti-money laundering-check-; article; 3 pages, downloaded Jul. 1, 2021; Crowdcube Capital Ltd.

* cited by examiner

*Primary Examiner* — Scott S Trotter
(74) *Attorney, Agent, or Firm* — Banner & Witcoff, Ltd.

(57) ABSTRACT

Various aspects of the disclosure relate to automated compliance verification systems for authenticating and verifying compliance associated with electronic transactions. A compliance verification platform may be an intermediary between an application for managing and/or recording transactions and a transaction processing platform for processing a transaction. Based on successful compliance verification and authentication, the compliance verification platform may send notifications to the transaction processing platform to process a transaction requested via the application.

20 Claims, 4 Drawing Sheets

APPLICATION PROGRAMMING INTERFACE (API)-ENABLED AUTOMATED COMPLIANCE VERIFICATION AND PROCESSING

FIELD

Aspects described herein generally relate to the field of automated compliance verification, and more specifically to automated compliance verification and processing of electronic transactions.

BACKGROUND

Enterprise organizations (e.g., banking and financial institutions) processing a transaction (e.g., an electronic fund transfer) may need to perform various authentication and compliance checks as part of the transaction processing. The authentication and compliance checks may be for fulfilling compliance requirements associated with anti-money laundering (AML) regulations, know your customer (KYC) guidelines, etc. For example, in response to a financial transaction requested by a client, a financial institution may perform KYC processing and generate a decision (e.g., approval or denial) for the financial transaction requested by the client.

SUMMARY

Aspects of the disclosure provide solutions that address and overcome technical problems associated with automated verification of compliance requirements associated with online transactions and other operations. In particular, one or more aspects of the disclosure relate to use of application programming interfaces (APIs) for communicating with applications (e.g., associated with recording and management of transactions) for the purposes of authentication and compliance verification.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a user computing device configured to receive, via a graphical user interface (GUI) associated with an application, a record for an electronic fund transfer, wherein the electronic fund transfer is associated with a source account and a destination account. The user computing device also includes a compliance verification platform communicatively coupled to the user computing device and a transaction processing platform. The compliance verification platform may include: at least one processor; and memory storing computer-readable instructions that, when executed by the at least one processor, cause the compliance verification platform to perform one or more operations. For example, the compliance verification platform may receive, from the user computing device via an application programming interface (API), indications of the source account and the destination account. The compliance verification platform may perform a compliance check associated with the electronic fund transfer, where performing the compliance check may include authenticating the user computing device using a security certificate received from the user computing device. Based on successful performance of the compliance check, the compliance verification platform may send: a first notification, to a transaction processing server, to process the electronic fund transfer; and a second notification to the user computing device. The transaction processing platform may be configured to process the electronic fund transfer based on receiving the first notification. Processing the electronic fund transfer may include processing a transfer of funds from the source account to the destination account. The GUI may be configured to display an indication of the successful performance of the compliance check and processing of the electronic fund transfer (e.g., based on receiving the second notification). Other embodiments of this aspect include corresponding computer systems, apparatus, and computer programs recorded on one or more computer storage devices, each configured to perform the actions of the methods.

Implementations may include one or more of the following features. The performing the compliance check further may include cross-checking the source account and the destination account against a database of flagged accounts. The performing the compliance check further may include storing an indication of the electronic fund transfer in a database associated with the compliance verification platform. The storing the indication of the electronic fund transfer in the database may be based on a transaction value associated with the electronic fund transfer being greater than a threshold. The security certificate may be a self-signed certificate. The security certificate may be signed by a trusted certificate authority. The sending the first notification further may include selecting an encryption protocol to use for encrypting the first notification based on compliance requirements associated with the electronic fund transfer. Implementations of the described techniques may include hardware, a method or process, or computer software on a computer-accessible medium.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

A user may initiate financial transactions (e.g., an electronic fund transfer) via a financial institution. The financial institution may have systems and protocols to perform various authentication and compliance verification processes (e.g., based on AML regulations, KYC checks) prior to initiating the financial transaction. The user may further may use an application/document (e.g., accounting software, spreadsheet, ledger management software, etc.) for recording and/or managing the financial transactions. Current protocols associated with authentication and compliance verification do not enable the application to communicate with systems performing authentication and compliance verification within the financial institution. As such, the various authentication and compliance checks performed by the financial institution may not be immediately accessible to the application. Since successful processing of the financial transaction is dependent on successful authentication and compliance verification, a client may need to separately and manually check whether a requested financial transaction was successfully completed (or has failed due to compliance issues). This may increase the manual effort required for user. In other words, the user may have to input the financial transaction into the application and separately check whether the transaction was successful.

Various examples described herein provide an interface (e.g., an application programming interface (API)) between an application for recording financial transactions (e.g., ledger management software, accounting software, spreadsheet, etc.) and systems associated with authentication and compliance verification. In an example arrangement, the authentication and compliance verification may be tied to processing of a financial transaction (e.g., an electronic fund transfer). For example, an electronic fund transfer may be initiated based on a compliance verification server determining that there are no compliance issues associated with the electronic fund transfer.

Figure 1A:
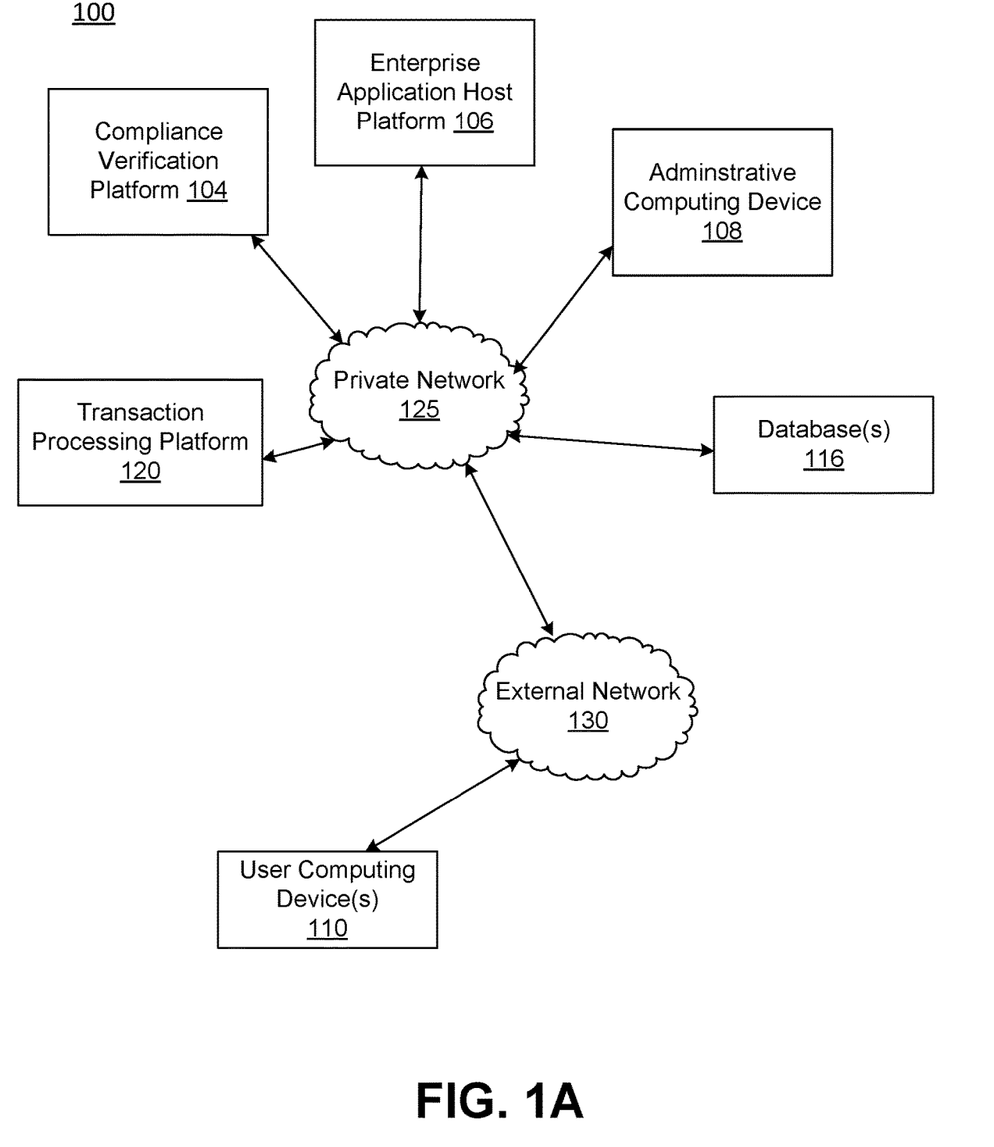
FIG. 1A shows an illustrative computing environment for compliance verification, in accordance with one or more example arrangements.

FIG. 1A shows an illustrative computing environment 100 for compliance verification, in accordance with one or more arrangements. The computing environment 100 may comprise one or more devices (e.g., computer systems, communication devices, and the like). The computing environment 100 may comprise, for example, a compliance verification platform 104, an enterprise application host platform 106, an administrative computing device 108, a transaction processing platform 120, and/or one or more database(s) 116. The one or more of the devices and/or systems, may be linked over a private network 125 associated with an enterprise organization (e.g., a financial institution). The computing environment 100 may additionally comprise one or more user devices 110 connected, via a public network 130, to the devices in the private network 125. The devices in the computing environment 100 may transmit/exchange/share information via hardware and/or software interfaces using one or more communication protocols. The communication protocols may be any wired communication protocol(s), wireless communication protocol(s), one or more protocols corresponding to one or more layers in the Open Systems Interconnection (OSI) model (e.g., local area network (LAN) protocol, an Institution of Electrical and Electronics Engineers (IEEE) 802.11 WIFI protocol, a $3^{rd}$ Generation Partnership Project (3GPP) cellular protocol, a hypertext transfer protocol (HTTP), etc.). While FIG. 1A shows the transaction processing platform 120 as being associated with the enterprise organization and connected to the private network 125, in other examples, the transaction processing platform 120 may be separate from the enterprise organization (e.g., may correspond to another financial institution).

The compliance verification platform 104 may comprise one or more computing devices and/or other computer components (e.g., processors, memories, communication interfaces) configured to perform one or more functions as described herein. Further details associated with the architecture of the compliance verification platform 104 are described with reference to FIG. 1B.

The enterprise application host platform 106 may comprise one or more computing devices and/or other computer components (e.g., processors, memories, communication interfaces). In addition, the enterprise application host platform 106 may be configured to host, execute, and/or otherwise provide one or more enterprise applications. In an arrangement where the private network 125 is associated with a financial institution (E.g., a bank), the enterprise application host platform 106 may be configured, for example, to host, execute, and/or otherwise provide one or more transaction processing programs, such as an online banking application, fund transfer applications, and/or other programs associated with the financial institution. The enterprise application host platform 106 may comprise various servers and/or databases that store and/or otherwise maintain account information, such as financial account information including account balances, transaction history, account owner information, and/or other information. In addition, the enterprise application host platform 106 may process and/or otherwise execute transactions on specific accounts based on commands and/or other information received from other computer systems comprising the computing environment 100.

The administrative computing device 108 may be a personal computing device (e.g., desktop computer, laptop computer) or mobile computing device (e.g., smartphone, tablet). In addition, an administrative computing device 108 may be linked to and/or operated by a specific enterprise user (who may, for example, be an employee or other affiliate of the enterprise organization) who may have administrative privileges to perform various operations within the private network 125.

The transaction processing platform 120 may comprise one or more computing devices and/or other computer components (e.g., processors, memories, communication interfaces). The transaction processing platform 120 may be configured, for example, to host, execute, and/or otherwise provide one or more transaction processing programs, such as electronic fund transfer applications, online loan processing applications, and/or other programs associated with the financial institution. With reference to the example where the transaction processing platform 120 is for processing an electronic fund transfer, the transaction processing platform 120 may be associated with a specific transfer channel (e.g., wire transfer channel, automatic clearing house (ACH) transfer channel, etc.) and may perform communicate with one or more other platforms within the channel to process the electronic fund transfer.

The user device(s) 110 may be computing devices (e.g., desktop computers, laptop computers) or mobile computing device (e.g., smartphones, tablets) connected to the network

125. The user device(s) 110 may be configured to enable the user to access the various functionalities provided by the devices, applications, and/or systems in the network 125.

The database(s) 116 may comprise one or more computer-readable memories storing information that may be used by the compliance verification platform 104. For example, the database(s) 116 may store a listing of accounts that may be potentially associated with compliance issues (e.g., accounts associated with geographical areas that are not serviced by the financial institution, accounts subject to sanctions by a regulatory authority, etc.). In an arrangement, the database(s) 116 may be used for other purposes as described herein.

In one or more arrangements, the compliance verification platform 104, the enterprise application host platform 106, the administrative computing device 108, the transaction processing platform 120, the user devices 110, and/or the other devices/systems in the computing environment 100 may be any type of computing device capable of receiving input via a user interface, and communicating the received input to one or more other computing devices in the computing environment 100. For example, the compliance verification platform 104, the enterprise application host platform 106, the administrative computing device 108, the transaction processing platform 120, and/or the other devices/systems in the computing environment 100 may, in some instances, be and/or include server computers, desktop computers, laptop computers, tablet computers, smart phones, wearable devices, or the like that may comprised of one or more processors, memories, communication interfaces, storage devices, and/or other components. Any and/or all of the compliance verification platform 104, the enterprise application host platform 106, the administrative computing device 108, the transaction processing platform 120, and/or the other devices/systems in the computing environment 100 may, in some instances, be and/or comprise special-purpose computing devices configured to perform specific functions.

Figure 1B:
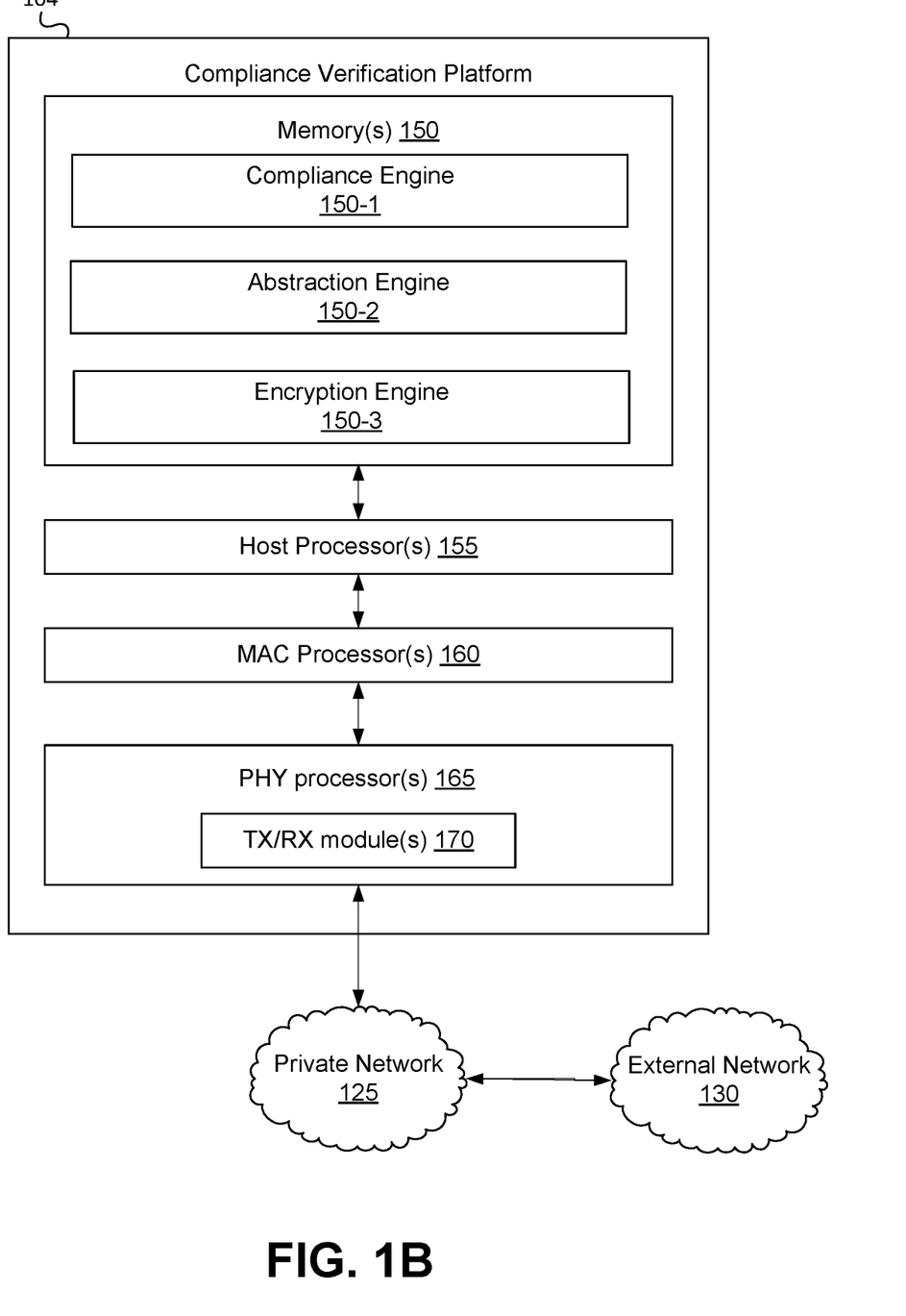
FIG. 1B shows an example compliance verification platform, in accordance with one or more example arrangements.

FIG. 1B shows an example compliance verification platform 104 in accordance with one or more examples described herein. The compliance verification platform 104 may comprise one or more of host processor(s) 155, medium access control (MAC) processor(s) 160, physical layer (PHY) processor(s) 165, transmit/receive (TX/RX) module(s) 170, memory 150, and/or the like. One or more data buses may interconnect host processor(s) 155, MAC processor(s) 160, PHY processor(s) 165, and/or Tx/Rx module(s) 170, and/or memory 150. The compliance verification platform 104 may be implemented using one or more integrated circuits (ICs), software, or a combination thereof, configured to operate as discussed below. The host processor(s) 155, the MAC processor(s) 160, and the PHY processor(s) 165 may be implemented, at least partially, on a single IC or multiple ICs. Memory 150 may be any memory such as a random-access memory (RAM), a read-only memory (ROM), a flash memory, or any other electronically readable memory, or the like.

Messages transmitted from and received at devices in the computing environment 100 may be encoded in one or more MAC data units and/or PHY data units. The MAC processor(s) 160 and/or the PHY processor(s) 165 of the compliance verification platform 104 may be configured to generate data units, and process received data units, that conform to any suitable wired and/or wireless communication protocol. For example, the MAC processor(s) 160 may be configured to implement MAC layer functions, and the PHY processor(s) 165 may be configured to implement PHY layer functions corresponding to the communication protocol. The MAC processor(s) 160 may, for example, generate MAC data units (e.g., MAC protocol data units (MPDUs)), and forward the MAC data units to the PHY processor(s) 165. The PHY processor(s) 165 may, for example, generate PHY data units (e.g., PHY protocol data units (PPDUs)) based on the MAC data units. The generated PHY data units may be transmitted via the TX/RX module(s) 170 over the private network 155. Similarly, the PHY processor(s) 165 may receive PHY data units from the TX/RX module(s) 165, extract MAC data units encapsulated within the PHY data units, and forward the extracted MAC data units to the MAC processor(s). The MAC processor(s) 160 may then process the MAC data units as forwarded by the PHY processor(s) 165.

One or more processors (e.g., the host processor(s) 155, the MAC processor(s) 160, the PHY processor(s) 165, and/or the like) of the compliance verification platform 104 may be configured to execute machine readable instructions stored in memory 150. The memory 150 may comprise (i) one or more program modules/engines having instructions that when executed by the one or more processors cause the compliance verification platform 104 to perform one or more functions described herein and/or (ii) one or more databases that may store and/or otherwise maintain information which may be used by the one or more program modules/engines and/or the one or more processors. The one or more program modules/engines and/or databases may be stored by and/or maintained in different memory units of the compliance verification platform 104 and/or by different computing devices that may form and/or otherwise make up the compliance verification platform 104. For example, the memory 150 may have, store, and/or comprise a compliance engine 150-1, an abstraction engine 150-2, and/or an encryption engine 150-3. The compliance engine 150-1 may have instructions that direct and/or cause the compliance verification platform 104 to perform one or more operations associated with verifying whether or not compliance requirements associated with a financial transaction (e.g., as submitted by an application via an API) are satisfied. The abstraction engine 150-2 may have instructions that may cause the compliance verification platform 104 to add a layer of abstraction to an identity associated with a user submitting the financial transaction. The encryption engine 150-3

While FIG. 1A illustrates the compliance verification platform 104, the enterprise application host platform 106, the administrative computing device 108, the transaction processing platform 120, and the databases 116, as being separate elements connected in the private network 125, in one or more other arrangements, functions of one or more of the above may be integrated in a single device/network of devices. For example, elements in the compliance verification platform 104 (e.g., host processor(s) 155, memory(s) 150, MAC processor(s) 160, PHY processor(s) 165, TX/RX module(s) 170, and/or one or more program/modules stored in memory(s) 150) may share hardware and software elements with and corresponding to, for example, the enterprise application host platform 106, and/or the transaction processing platform 120.

Figure 2:
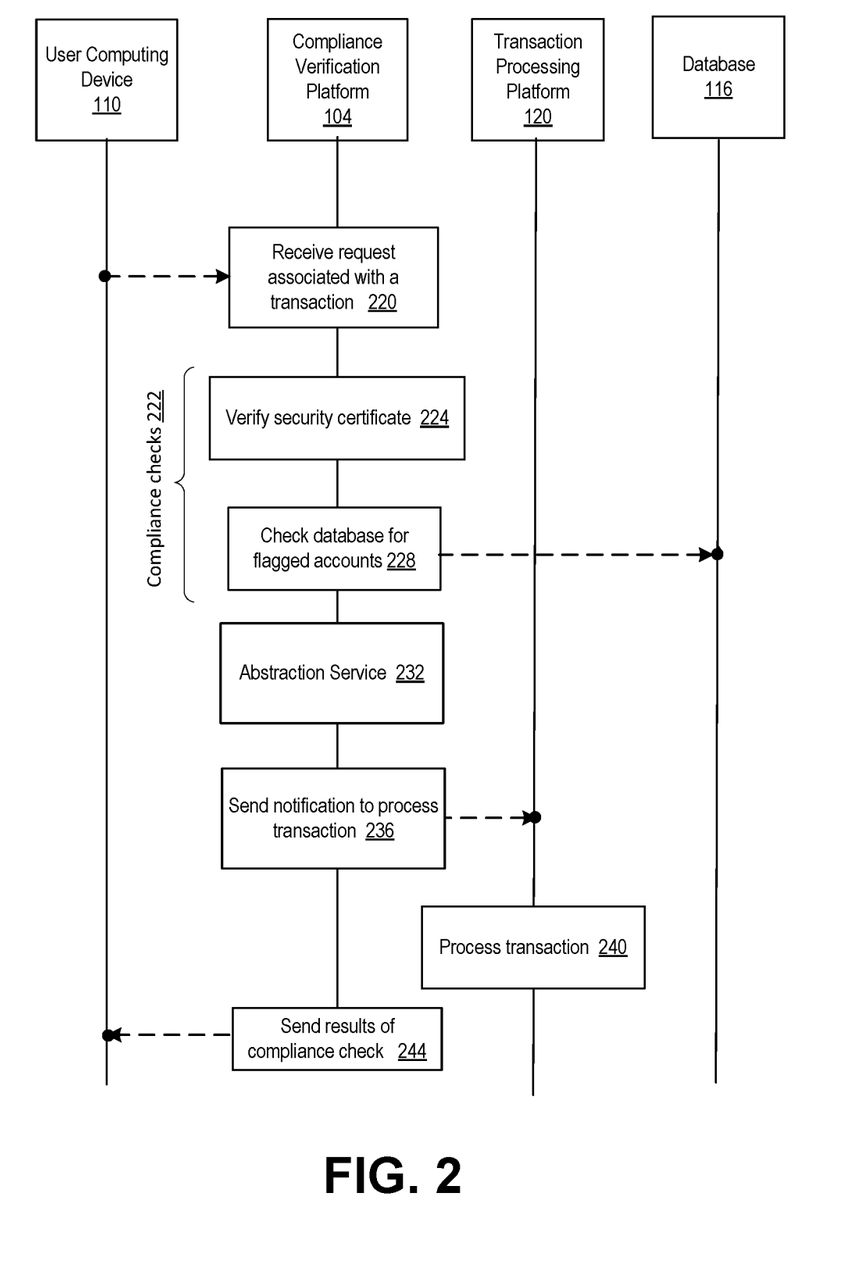
FIG. 2 shows an illustrative event sequence for compliance verification and transaction processing of a submitted financial transaction, in accordance with one or more example arrangements.
Figure 3A:
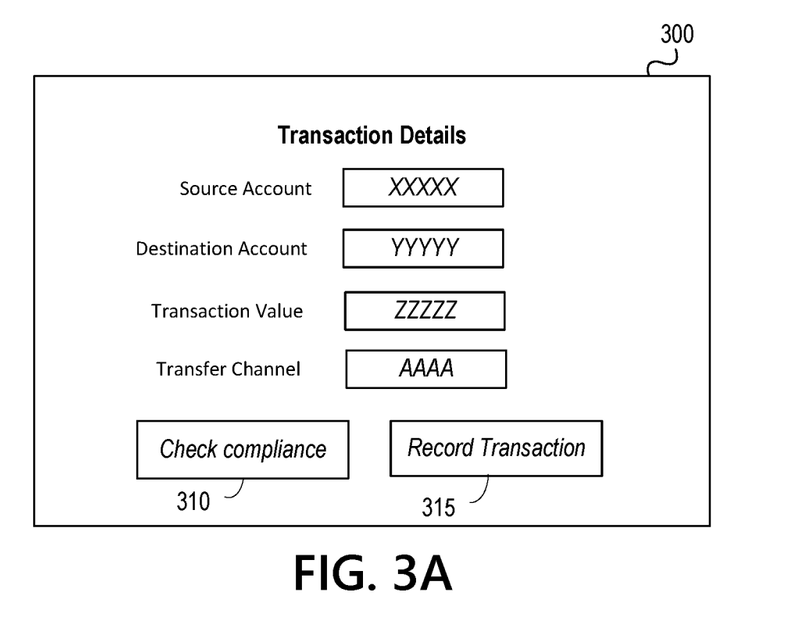
FIG. 3A shows an example graphical user interface (GUI) that may be presented at a user computing device to initiate a transaction, in accordance with one or more example arrangements.

FIG. 2 shows an illustrative event sequence for compliance verification and transaction processing of a submitted financial transaction. The user computing device 110 may be used to initiate (e.g., submit, record) a transaction via an application (e.g., ledger management software, accounting software, spreadsheet, etc.). For example, the transaction may correspond to an electronic fund transfer between a source account and a destination account (e.g., via a particular transfer channel, such as automatic clearing house (ACH) transfer, wire transfer, a digital payments network, etc.). FIG. 3A shows an example graphical user interface (GUI) 300 that may be presented at the user computing device 110 to initiate a transaction. The GUI 300 may be used to input the source account number, a destination account number, and a transaction value (e.g., a value of the fund transfer). A user associated with the user computing device 110 may check compliance associated with the transaction by selecting a "check compliance" button 310. Alternatively, the user may record the transaction by selecting a "record transaction" button 315. Based on user input and user selection, details associated with the transaction may be communicated, via an API, to the compliance verification platform 104. The user computing device 110 may send the details associated with the transaction using a transmission control protocol (TCP) to ensure that the details associated with the transaction are reliably received by the compliance verification platform 104. Additionally, cryptographic tokens may be used to ensure that the transaction details are sent in a secured manner. Further, the user computing device 110 may send the details along with a security certificate (e.g., public key certificate, a self-signed certificate, a certificate signed by a trusted authority). At step 220, the compliance verification platform 104 may receive the details associated with the transaction.

At step 222, the compliance verification platform 104 may perform one or more compliance checks to verify compliance of the transaction. For example, at step 224, the compliance verification platform 104 may check the security certificate to authenticate the user initiating the transaction. As described above, the database 116 may comprise a listing of accounts that may be associated with compliance issues (e.g., authenticating documents associated with the accounts not on record/not submitted and verified). At step 228, the compliance verification platform 104 may check whether the source account and/or the destination account are listed in the database 116. If the transaction is not compliant (e.g., security certificate is not valid and/or the accounts are listed in the database 116), the compliance verification platform 104 may flag the transaction and send a notification to user computing device 110 (e.g., as further described with respect to step 244). In an arrangement, the compliance verification platform 104 may perform one or more additional compliance checks. For example, the compliance verification platform may check whether the source account and/or the destination account are associated with geographic locations not serviced by the financial institution or subject to restrictions by a regulatory authority (e.g., Office of Foreign Assets Control (OFAC)).

If the compliance verification platform 104 determines that there are no compliance issues associated with the transaction (e.g., security certificate is valid, source account/destination account not in the database 116/not subject to regulatory restrictions), the compliance verification platform may initiate further processing of the transaction. For example, at step 232, the abstraction engine 150-2 associated with the compliance verification platform 104 may add a layer of abstraction to an identity associated with the source account. For example, the identity of the user initiating the transaction may be replaced by a trust associated with the user to ensure that the identity is not visible to the transaction processing platform 120. Addition of a layer of abstraction may protect the user against any data breaches that may occur at the transaction processing platform. The abstraction may effectively "mask" an identity/details associated with the user, thereby ensuring that the user remains protected in the event of a compromise at the transaction processing platform 120. The use of the abstraction engine 150-2 may be subject to regulatory requirements associated with the transaction.

At step 236, the compliance verification platform 104 may send details associated with the transaction (e.g., the source account, the destination account, the transaction value) to the transaction processing platform 120 associated with the transaction. Sending the details associated with the transaction may comprise encrypting the details (e.g., based on compliance requirements associated with the transaction) using a selected encryption level. The encryption level may be based on a type of the transaction and compliance requirements associated with the transaction. For example, a fund transfer via a first transfer channel (e.g., wire transfer) may require a higher level of encryption than a fund transfer via a second transfer channel (e.g., ACH transfer).

At step 240, the transaction processing platform 120 may process the transaction. In an arrangement where the transaction corresponds to a fund transfer, the transaction processing platform may perform one or more operations to transfer funds from the source account to the destination account.

Figure 3B:
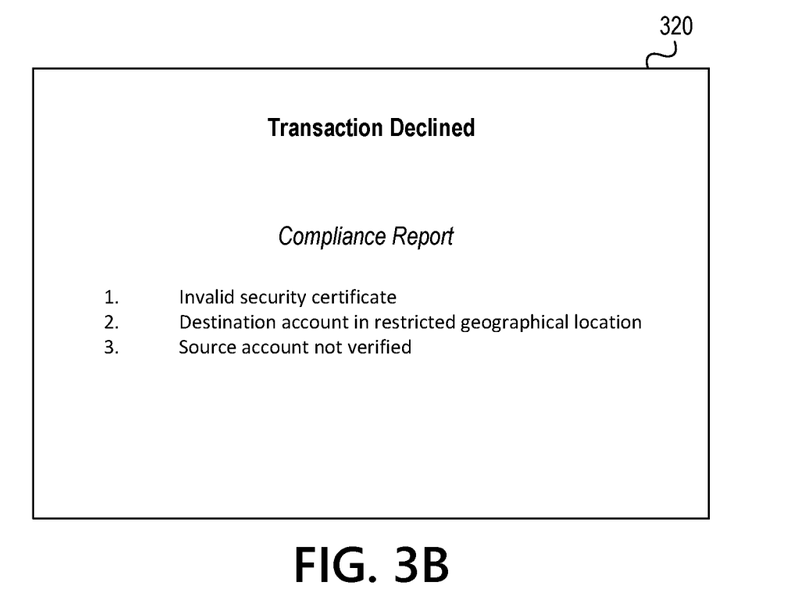
FIG. 3B shows an example GUI as displayed that may be presented at a user computing device based on a received indication of failed compliance checks, in accordance with one or more example arrangements.

At step 244, the compliance verification platform 104 may send results of the compliance checks to the user computing device 110. For example, if the compliance verification platform 104 determines that the transaction is compliant, the compliance verification platform 104 may send an indication of the same to the user computing device 104. If the compliance verification platform determines that the transaction is not compliant, the compliance verification platform may send an indication that the transaction is not compliant and/or was declined. The indication may further indicate/specify which of the compliance checks that the transaction failed. For example, FIG. 3B shows an example GUI 320 as displayed at the user computing device 110 based on a received indication of failed compliance checks for a transaction. The GUI 320 may display a compliance report indicating the reasons for which the transaction was found to be non-compliant.

Additionally, the compliance verification platform 104 may send indications of suggested steps to be taken by the user to overcome the compliance issues. For example, the compliance verification platform 104 may indicate the user use a different source account and/or a different destination account. The compliance verification platform 104 may indicate the user use a different payment channel for processing the transaction.

One or more of the steps 220-244 may be skipped. For example, steps 232, 236, and 240 may be skipped if the user only wishes to check compliance associated with the transaction and does not wish to process the transaction (e.g., the user selects the "check compliance" button via the GUI 300). While FIGS. 2, 3A, 3B describe operation of the compliance verification platform 104 with respect to transaction corresponding to a fund transfer, the compliance verification platform 104 may be used for authenticating and verifying compliance associated with any type of transaction submitted by the application (and processed by the transaction processing platform 120).

The compliance verification platform 104 may advantageously offload various authentication and compliance verification tasks, associated with a transaction, from an end user, the application, and/or the transaction processing platform 120. This may reduce manual effort required by the end user of the application for verifying compliance associated with a transaction. Further, the transaction processing platform 120 (or an administrative user associated with it) need not separately authenticate and verify compliance associated with a submitted transaction, thereby increasing an efficiency of transaction processing. Additionally, the compliance verification platform 104 may be flexibly programmed to accommodate different and constantly changing compliance requirements. For example, different types of transactions and/or applications may require different types of compliance checks. The compliance verification platform 104 may determine the types of compliance checks based on the type of transaction and/or an application used for initiating/submitting the transaction. The compliance verification platform 104 may be flexibly integrated with multiple types of applications via the use of APIs for communicating information between the compliance verification platform 104 the applications.

One or more aspects of the disclosure may be embodied in computer-usable data or computer-executable instructions, such as in one or more program modules, executed by one or more computers or other devices to perform the operations described herein.

Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally, or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

The invention claimed is:

1. A system for user authentication and compliance verification for recorded transactions in an application for management of financial transactions, the system comprising:
   a user computing device configured to receive, via a graphical user interface (GUI) associated with an application, a record for an electronic fund transfer, wherein the electronic fund transfer is associated with a source account and a destination account;
   a compliance verification platform communicatively coupled to the user computing device, the compliance verification platform comprising:
   at least one processor; and
   memory storing computer-readable instructions that, when executed by the at least one processor, cause the compliance verification platform to:
      receive, from the user computing device via an application programming interface (API), indications of the source account and the destination account;
      perform, based on the received indications of the source account and the destination account, a compliance check associated with the electronic fund transfer, wherein performing the compliance check comprises:
         authenticating the user computing device using a security certificate received from the user computing device, and
         checking, prior to processing the electronic fund transfer, whether geographical locations associated with the source account and the destination account are in a restricted area; and
      based on successful performance of the compliance check, sending:
         a first notification, to a transaction processing platform associated with an electronic fund transfer channel and separate from the compliance verification platform, to process the electronic fund transfer; and
         a second notification, via the API, to the user computing device;
   wherein the transaction processing platform is configured to process the electronic fund transfer based on receiving the first notification, wherein processing the electronic fund transfer comprises processing a transfer of funds from the source account to the destination account, and wherein the GUI is configured to display, based on the second notification, an indication of the successful performance of the compliance check and processing of the electronic fund transfer.

2. The system of claim 1, wherein the performing the compliance check further comprises cross-checking the source account and the destination account against a database of flagged accounts.

3. The system of claim 1, wherein the performing the compliance check further comprises storing an indication of the electronic fund transfer in a database associated with the compliance verification platform.

4. The system of claim 3, wherein the storing the indication of the electronic fund transfer in the database is based on a transaction value associated with the electronic fund transfer being greater than a threshold.

5. The system of claim 1, wherein the security certificate is a self-signed certificate.

6. The system of claim 1, wherein the security certificate is signed by a trusted certificate authority.

7. The system of claim 1, wherein the sending the first notification further comprises selecting an encryption protocol to use for encrypting the first notification based on compliance requirements associated with the electronic fund transfer.

8. A method comprising:
receiving, at a compliance verification platform, from a user computing device via an application programming interface (API), indications of a source account and a destination account associated with an electronic fund transfer;
performing, based on the received indications of the source account and the destination account, a compliance check associated with the electronic fund transfer, wherein performing the compliance check comprises:
authenticating the user computing device using a security certificate received from the user computing device, and
checking, prior to processing the electronic fund transfer, whether geographical locations associated with the source account and the destination account are in a restricted area; and
based on successful performance of the compliance check, sending:
a first notification, to a transaction processing platform associated with an electronic fund transfer channel and separate from the compliance verification platform, to process the electronic fund transfer; and
a second notification, via the API, to the user computing device, wherein the second notification indicates the successful performance of the compliance check;
wherein the transaction processing platform is configured to process the electronic fund transfer based on receiving the first notification, wherein processing the electronic fund transfer comprises processing a transfer of funds from the source account to the destination account.

9. The method of claim 8, wherein the performing the compliance check further comprises cross-checking the source account and the destination account against a database of flagged accounts.

10. The method of claim 8, wherein the performing the compliance check further comprises storing an indication of the electronic fund transfer in a database associated with the compliance verification platform.

11. The method of claim 10, wherein the storing the indication of the electronic fund transfer in the database is based on a transaction value associated with the electronic fund transfer being greater than a threshold.

12. The method of claim 8, wherein the security certificate is a self-signed certificate.

13. The method of claim 8, wherein the security certificate is signed by a trusted certificate authority.

14. The method of claim 8, wherein the sending the first notification further comprises selecting an encryption protocol to use for encrypting the first notification based on compliance requirements associated with the electronic fund transfer.

15. A non-transitory computer-readable medium storing computer-executable instructions that, when executed by a computer processor, causes a computing platform to:
receive, from a user computing device via an application programming interface (API), indications of a source account and a destination account associated with an electronic fund transfer;
perform, based on the received indications of the source account and the destination account, a compliance check associated with the electronic fund transfer, wherein performing the compliance check comprises:
authenticating the user computing device using a security certificate received from the user computing device, and
checking, prior to processing the electronic fund transfer, whether geographical locations associated with the source account and the destination account are in a restricted area; and
based on successful performance of the compliance check, send:
a first notification, to a transaction processing platform associated with an electronic fund transfer channel and separate from the computing platform, to process the electronic fund transfer; and
a second notification, via the API, to the user computing device, wherein the second notification indicates the successful performance of the compliance check;
wherein the transaction processing platform is configured to process the electronic fund transfer based on receiving the first notification, wherein processing the electronic fund transfer comprises processing a transfer of funds from the source account to the destination account.

16. The non-transitory computer-readable medium of claim 15, wherein the performing the compliance check further comprises cross-checking the source account and the destination account against a database of flagged accounts.

17. The non-transitory computer-readable medium of claim 15, wherein the performing the compliance check further comprises storing an indication of the electronic fund transfer in a database associated with the computing platform.

18. The non-transitory computer-readable medium of claim 17, wherein the storing the indication of the electronic fund transfer in the database is based on a transaction value associated with the electronic fund transfer being greater than a threshold.

19. The non-transitory computer-readable medium of claim 15, wherein the security certificate is a self-signed certificate.

20. The non-transitory computer-readable medium of claim 15, wherein the sending the first notification further comprises selecting an encryption protocol to use for encrypting the first notification based on compliance requirements associated with the electronic fund transfer.

* * * * *